UNITED STATES PATENT OFFICE.

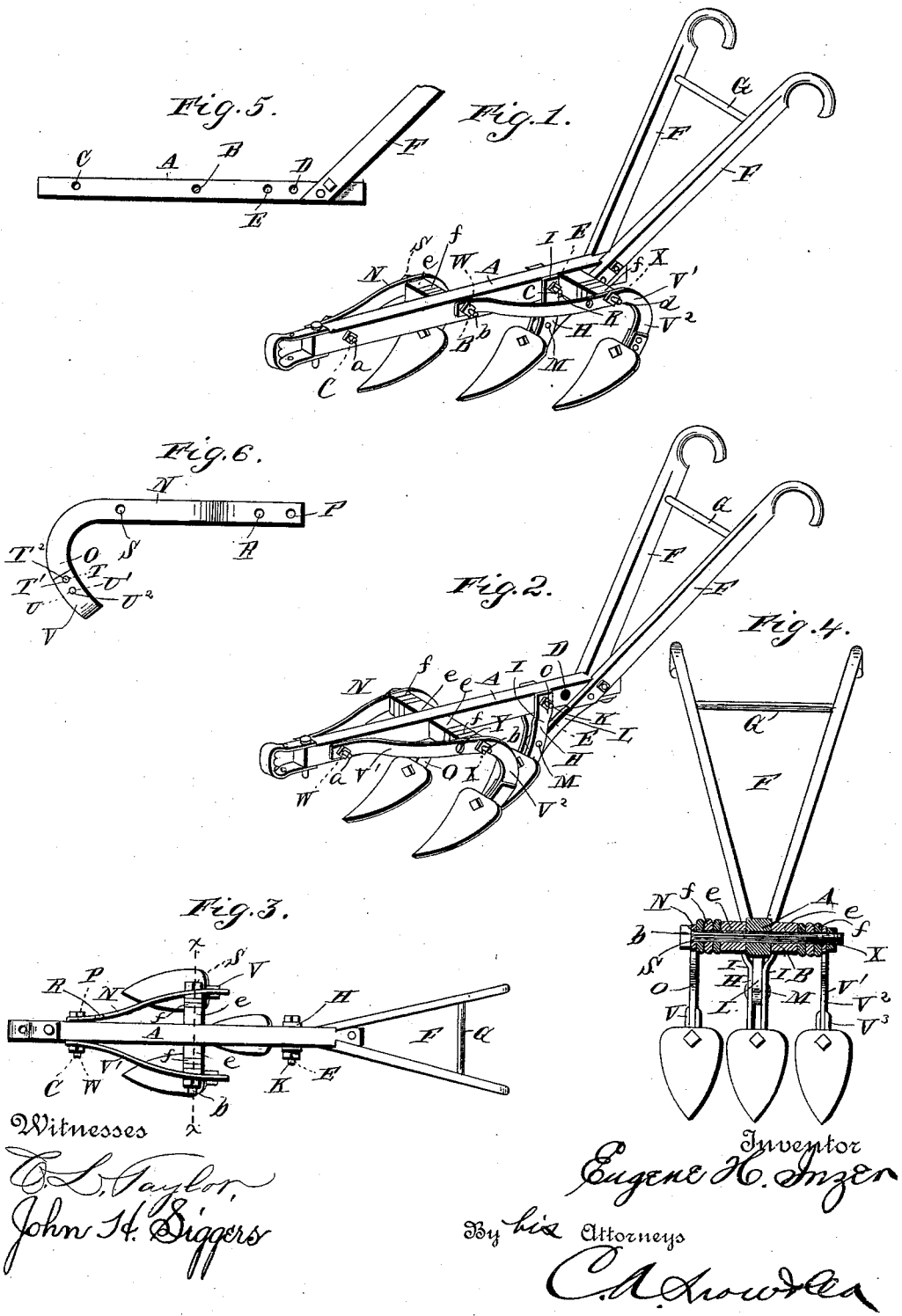

EUGENE HEMBREY INZER, OF TRUSSVILLE, ALABAMA.

PLOW.

SPECIFICATION forming part of Letters Patent No. 359,321, dated March 15, 1887.

Application filed December 21, 1886. Serial No. 222,197. (No model.)

*To all whom it may concern:*

Be it known that I, EUGENE HEMBREY INZER, a citizen of the United States, residing at Trussville, in the county of Jefferson and State of Alabama, have invented a new and useful Improvement in Plows, of which the following is a specification.

My invention relates to an improvement in plows; and it consists in the peculiar construction and combination of devices, that will be more fully set forth hereinafter, and particularly pointed out in the claim.

In the drawings, Figure 1 is a perspective view of a plow embodying my improvements, with the three shovels arranged in an oblique line. Fig. 2 is a similar view with two of the shovels arranged in a transverse line in advance of the rear shovel. Fig. 3 is a top plan view. Fig. 4 is a vertical transverse sectional view taken on the line $x$ $x$ of Fig. 3. Figs. 5 and 6 are detail sectional views.

The object of my invention is to provide a plow which is adapted for use in cultivating various kinds of plants, thereby rendering it unnecessary for the planter to have more than one plow in order to cultivate different kinds of growing crops.

A represents a plow-stock, which is provided at the center with a transverse opening, B, and has an opening, C, near its front end, and a similar opening, D, near its rear end. Slightly in advance of the opening D is a transverse opening, E. To the rear end of the plow-stock is bolted a pair of plow-handles, F, which are of the usual construction, and are connected near their upper ends by a rung, G.

H represents a standard, which is made of a single piece of metal, bent in the center so as to form a pair of parallel arms, I. The upper ends of the said arms diverge and are adapted to bear against opposite sides of the plow-stock, and a bolt, K, passes through openings which are made in the upper ends of the said arms and through the opening E, and serves to secure the standard firmly to the stock.

L represents a brace-rod, which has its rear ends bolted under the rear end of the plow-stock, and the front end of the said brace-rod is pivoted between the parallel arms of the standard on a bolt or pin, M.

N represents a plow beam or arm, which is made of a metallic bar, bent in the form here shown and having its rear portion curved downwardly to form a standard, O. In the front end of the beam or arm is made an opening, P, and in rear of the said opening is an opening, R. Near the rear end of the beam or arm is a transverse opening, S, and the lower end of the curved standard, formed at the rear end of the arm, is provided with a pair of openings, T and U, which are arranged one above the other, as shown.

V represents a yoke, which is made of a flat bar of metal bent in the form of the letter U, and having the parallel arms adapted to bear on opposite sides of the lower end of the curved standard O. Through these arms are made openings T' and U', which are adapted to register with the openings T and U of the curved standard. A metallic bolt, T$^2$, passes through the openings T and T', and a wooden pin, U$^2$, passes through the openings U and U', the function of the said bolt and pin being to secure the yoke to the lower end of the standard.

V' represents a plow beam or arm, which is similar in construction to the beam or arm N, and is provided at its front end with an opening, W. Near its rear end is an opening, X, and at a suitable distance in front thereof is an opening, Y. The space between the openings Y and X is exactly equal to the space between the openings P and R of the beam or arm N. The rear end of the beam or arm V' is curved to form a standard, V$^2$, to which is attached a yoke, V$^3$, that is similar in construction to the yoke V, and is secured to the curved standard V' by means of a metallic bolt and a wooden pin, as in the previous instance.

$a$, $b$, $c$, and $d$ represent a series of bolts of different lengths, which are adapted to pass through the openings in the plow-stock and in the plow beams or arms, so as to secure the latter to the former.

$e$ represents a series of space-blocks, which are adapted to be strung or fitted upon the said bolts, and $f$ represents space disks or plates, which are also adapted to be secured on the said bolts.

In order to form a plow having three shovels or points arranged in a single oblique line, as shown in Fig. 1, the beam or arm N is attached to the right-hand side of the plow-stock, at the front end thereof, by passing the bolt *a* through the openings P and C. The bolt *b* is then passed through the opening S, one of the blocks *e* and a pair of the disks or plates *f* are then strung on the said bolt, and the latter is passed through the opening B in the plow-stock, so as to secure the rear end of the beam or arm N at a suitable distance from one side of the plow-stock. On the opposite end of the bolt *b* are placed a pair of disks or plates, *f*. The said bolt is then inserted through the opening W at the front end of the beam or arm V', and a nut is screwed on the bolt so as to clamp the front of the beam in place. The bolt *c* is then passed through the opening *d*, one of the space-blocks E, and a pair of the space-disks are secured on the bolt, and it is then passed through the opening X of the beam or arm V', and the clamping-nut is screwed onto the threaded end of the said bolt, so as to firmly secure the beam V' in place. Any desired variety of cultivating shovels or teeth are attached to the lower ends of the standards by means of bolts which pass between the parallel arms of the yokes.

It will be observed that when the plow encounters an obstruction and the shock is very great the shovel or cultivator tooth which comes in contact with the obstacle will be turned back with such force as to break the wooden pins $U^2$, and thus permit the yoke to turn rearwardly on the lower end of the standard and prevent the shovel or point from being broken or injured.

In order to arrange the plow with two of the shovels in a transverse line in advance of the rear shovel, as shown in Fig. 2, I remove the bolt *b* and the bolt *c*, so as to release the beam or arm V', and then move the said beam or arm forward to cause the opening W at the front end thereof to engage the bolt *a*. The bolt *b* is then substituted for the bolt *d*, a space-block, *e*, and a pair of space disks or plates, *f*, being strung on the bolt on each side of the plow-stock, and the bolt being passed through the opening S of the beam or arm N and the opening X of the beam or arm V'.

If it be desired to employ the plow as a double-shovel cultivator, this may be done by removing the standard K from the rear end of the plow-stock.

If it be desired to employ only one cultivating-shovel, the standard K may be attached to the rear end of the plow-stock, and beams N and V' removed therefrom. Other arrangements of the said beams N and V' may be effected on the plow-stock to adapt the plow for different purposes.

Having thus described my invention, I claim—

The combination of the plow-stock having the opening B at its center, the opening C near its front end and the openings D and E near its rear end, with the arm or beam N, having the openings P and R near its front end and the opening S near its rear end, the beam or arm V', having the opening W at its front end and the openings X and Y near its rear end, the bolts *a*, *b*, *c*, and *d*, of unequal lengths, to secure the arms or beams to the plow-stock on opposite sides thereof at varying longitudinal adjustments, and the space-blocks *e* and *f*, adapted to be strung upon the bolts to spread the rear ends of the beams or arms from the plow-stock, substantially as described.

In testimony that I claim the foregoing as my own I have hereto affixed my signature in presence of two witnesses.

EUGENE HEMBREY INZER.

Witnesses:
JNO. G. BRADLEY,
J. W. MCWILLIAMS.